Nov. 1, 1966  A. J. LUNDEEN ETAL  3,283,027
PREPARATION OF ALPHA-OLEFINS BY DEHYDRATION OF 2-ALCOHOLS
Filed Dec. 20, 1962
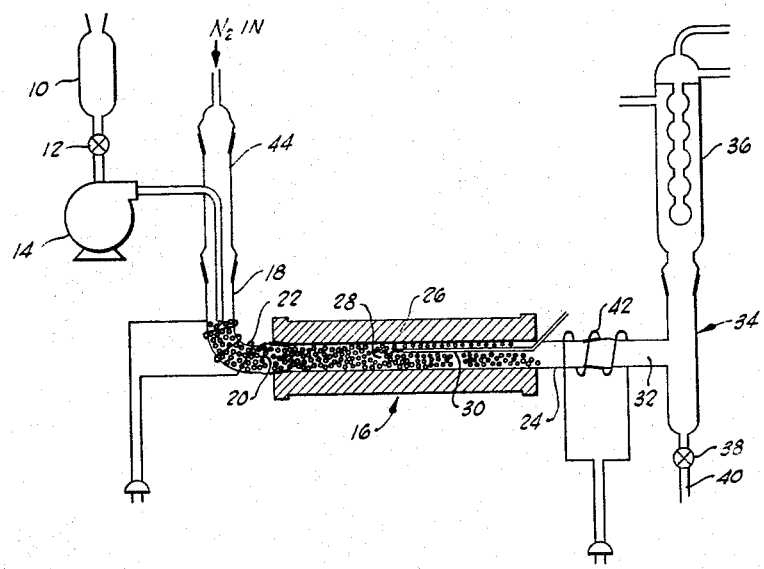
INVENTOR.
ALLAN J. LUNDEEN &
BY WILLIAM ROBERT VAN HOOZER
PATENT AGENT

United States Patent Office 3,283,027
Patented Nov. 1, 1966

3,283,027
PREPARATION OF ALPHA-OLEFINS BY
DEHYDRATION OF 2-ALCOHOLS
Allan J. Lundeen and William Robert Van Hoozer, Ponca City, Okla., assignors to Continental Oil Company, Ponca City, Okla., a corporation of Oklahoma
Filed Dec. 20, 1962, Ser. No. 250,199
12 Claims. (Cl. 260—682)

This invention relates to a method of synthesizing α-olefins by catalytically dehydrating secondary or 2-alcohols. More particularly, the present invention relates to a method of selectively dehydrating certain 2-alcohols over specific metal oxide catalysts to produce α-olefins of high purity.

It is well known that alcohols may be dehydrated to produce monoolefinic materials by passing the alcohols over the heated oxides of certain metals, such as aluminum oxide, thorium oxide, silicon dioxide, titanium oxide, magnesium oxide, tungsten oxide, chromium oxide, and zirconium oxide or mixtures thereof. The dehydration is usually carried out at atmospheric or subatmospheric pressures. The prior technical literature on the subject of this type of catalytic dehydration indicates that alumina, thoria and several of the other metal oxides are equivalents in their dehydrating effect and usually may be used interchangeably. Pines and Haag have reported in a paper published as page 2847 of volume 83 of the Journal of the American Chemical Society (1961) that α-olefins (terminally unsaturated olefins) may be obtained by dehydrating primary alcohols over an alumina catalyst. These workers further state that when 2-alcohols are dehydrated over the alumina catalyst, a mixture of internal olefin and α-olefin results, with the more stable internal olefin predominating.

In view of the heretofore repeated teachings and data indicating equivalency of alumina and thoria as alcohol dehydration catalysts, the thoria catalyst presumably would also be expected to yield predominantly the internally unsaturated olefins with a lesser amount of the terminal or α-olefinic material being formed from the 2-alcohols. At least one would expect substantial amounts of the internal olefin and that sufficient selectivity if any could not be obtained using catalytic dehydration techniques.

An object of the present invention is to provide a simple and economical method of selectively dehydrating 2-alcohols to produce α-olefins of high purity.

A more specific object of the invention is to provide an improved method for producing the α-olefin, 4-methyl-1-pentene, which material constitutes a valuable monomeric starting material for use in the production of high melting polymers. Since 4-methyl-1-pentene is a difficult monomer to prepare in high purity by other processes, this process provides an especially advantageous manner of preparing same in high purity.

Other objects and advantages of the invention will be perceived upon reading the following detailed description of the invention and the examples which illustrate certain embodiments of the invention. An apparatus which may be employed in practicing the invention is illustrated in the accompanying drawing.

We have now discovered that certain metal oxides catalysts as contrasted with alumina and still other metal oxides, possess the unexpected property of catalyzing the selective dehydration of 2-alcohols to α-olefins. The theoretical explanation for the selectivity of this catalyst material is not presently fully understood. Our experiments with this material, however, confirm the fact that a substantial predominance of α-olefin, as opposed to internal olefin, can be yielded by the passage of vaporized 2-alcohols over heated selected metal oxide catalysts. Generally, 90 percent and, in most instances, in excess of 95 percent of the dehydrated olefin product is of terminal or α-olefin molecular structure. In the case of one metal oxide; namely, thorium oxide, the yield of α-olefin is often above 98 percent. This process will produce the α-olefin with nearly quantitative selectivity employing thoria. Next to thoria, yttrium oxide is a preferred catalyst.

The discovery of this new highly selective technique for synthesizing α-olefins constitutes an extremely valuable and useful advance in the technology of olefin synthesis. For example, 4-methylpentene-1 is an α-olefinic material which shows promise of achieving a great deal of importance in the preparation of polymeric materials with a high melting point and which present certain advantages in this respect over the more widely used polyethylene and polypropylene polymers. Polymers produced from 4-methylpentene-1, for example, possess properties which make them materials of considerable interest in the manufacture of fibers and heat resistant plastic items. Other processes for the preparation of α-olefins, such as 4-methyl-1-pentene, yield a relatively impure product. The impurities comprise large amounts of β- or internal olefin, such as 4-methyl-2-pentene. Such isomers are very difficult to separate. The product produced by the selective dehydration process of this invention can be satisfactorily polymerized without purification. Noncatalytic techniques for the dehydration of 2-alcohols and acetate pyrolysis processes yield mixtures of olefins with the internal olefinic types being formed in significant amounts. Usually, the internal olefin is formed in an amount exceeding 50 percent. In addition to reduced yields of the desired α-olefins, such processes involve extensive separation operations to substantially remove the undesired internal olefins.

In brief, the present invention comprises contacting with a heated metal oxide or combination thereof, selected from the group consisting of thorium oxide, scandium oxide, yttrium oxide, and oxides of the rare earths consisting of lanthanum, cerium, praseodymium, neodymium, promethuem, samarium, europium, gadolinium, terbium, dysprosium, holmium, erbium, thulium, ytterbium, lutecium (i.e. $Ce_2O_3$, $CeO_2$, $Dy_2O_3$, $Er_2O_3$, $Eu_2O_3$, $EuO$, $Gd_2O_3$, $Ho_2O_3$, $La_2O_3$, $Lu_2O_3$, $Nd_2O_3$, $Pr_2O_3$, $PrO_2$, $Pr_6O_{11}$, $Sm_2O_3$, $SmO$, $Tb_2O_3$, $TbO_2$, $Tb_4O_7$, $Tm_2O_3$, $Yb_2O_3$, $YbO$, $Sc_2O_3$, $Y_2O_3$, $ThO_2$) a 2-alcohol of the generic structural formula:

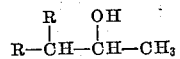

where R is selected from the group consisting of hydrogen, hydrocarbon radicals and substituted hydrocarbon radicals with the provision that at least one R is hydrocarbon in nature. Within the term hydrocarbon radical, we include alkyl, alkenyl, alkynyl, and cycloalkyl radicals. Within the term substituted hydrocarbons, we include radicals having a carbonyl, a hydroxyl, an alkoxy, an ester or a carboalkoxy group and an aryl radical thereon. Further provisions with regard to the 2-alcohols represented by the generic formula are that the double bond, the triple bond or the substituents should never be too close to the 2-alcohol carbon. More specifically, an aromatic ring is to be in the 4 or higher position, a keto oxygen is to be in the 5 or higher position, a double bond, triple bond hydroxy, alkoxy and an ester group are to be in the 6 or higher position and preferably 7 or higher position. Preferably the substituted hydrocarbon radicals contain a total of 1 to about 17 carbon atoms therein. Generally, those 2-alcohols in which one R is hydrogen and one R is a hydrocarbon or aralkyl radical of 1 to about 17 carbons work best. Within the foregoing group, a more preferred group of alcohols is where the hydrocarbon radical is an alkyl of 1 to 10 carbons. Another and still more preferred group of alcohols are those with the formula:

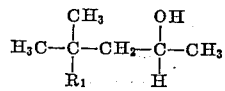

where $R_1$ represents a member selected from the group consisting of hydrogen, methyl, ethyl, propyl, cyclohexyl, cyclopentyl, phenyl, p-tolyl, α and β-naphthyl p-tert butyl phenyl and like radicals.

It should be recognized that the upper limit on the carbons of the 2-alcohols which may be used in this invention is determined by their ability to be vaporized. Since the alcohol must be in the vapor phase during the reaction, extremely high boiling alcohols would be difficult if not impossible to use. However, under very high vacuum, it is contemplated that alcohols of 30, 40 and even 50 carbon atoms can be successfully used in the process.

While we have indicated in general the compounds by carbon content which are suitable, it is to be understood that those having a boiling point above about 400° C. at a pressure below about 5 mm. Hg are not to be included even through the number of carbons does not exceed that specified any place herein. Because of branching of the carbon chain, certain alcohols will be suitable with a greater number of carbon atoms therein than others which are not suitable because of their high boiling points. The total carbon content set out is to be considered in light of said boiling point limitation, it not being practical to define each type of compound by structural configuration and carbon content which fits this provision. (Should some compounds sublime rather than boil those compounds are included if they sublime without decomposition at the suitable operating conditions.)

Specific illustrative examples of the suitable 2-alcohols are:

2-butanol
4-methyl-2-pentanol
2-pentanol
5-methyl-2-hexanol
4,4-dimethyl-2-pentanol
5,5-dimethyl-2-hexanol
2-heptanol
4-ethyl-2-heptanol
3-propyl-2-heptanol
4,6-dimethyl-2-heptanol
2-octanol
5-ethyl-2-octanol
7-methyl-2-octanol
2-nonanol
5,8-dimethyl-2-nonanol
5-butyl-2-nonanol
2-decanol
8-ethyl-2-decanol
6-methyl-2-decanol
7,7-dimethyl-2-decanol
6-propyl-4-ethyl-2-decanol
2-undecanol
9-methyl-2-undecanol
5,7,9-trimethyl-2-undecanol
8-decynyl-2-ol
15-hexadecynyl-2-ol
8-methyl-6-propyl-2-undecanol
2-dodecanol
5,7,10-trimethyl-2-dodecanol
11-methyl-2-dodecanol
6-ethyl-2-dodecanol
2-tridecanol
12-methyl-2-tridecanol
5,7,9,11,12-pentamethyl-tridecanol
5,7,8-trimethyl-2-tridecanol
8-methyl-2-tridecanol
2-tetradecanol
12-methyl-2-tetradecanol
12-methyl-7-pentyl-2-tetradecanol
2-pentadecanol
14-methyl-2-pentadecanol
13-ethyl-10-propyl-2-pentadecanol
15-methyl-8-propyl-2-pentadecanol
2-hexadecanol
16-methyl-2-hexadecanol
12-ethyl-8-ethyl-2-hexadecanol
2-heptadecanol
10-propyl-2-heptadecanol
2-octadecanol
17-methyl-2-octadecanol
2-nonadecanol
18-methyl-2-nonadecanol
14,14-dimethyl-2-nonadecanol
8-eicosanol
7-octenyl-2-ol
9-decenyl-2-ol
10-undecenyl-2-ol
8-dodecenyl-2-ol
12-tetradecenyl-2-ol
6-methyl-11-pentadecenyl-2-ol
10-propyl-8-hexadecenyl-2-ol
14-eicosenyl-2-ol
9-eicosenyl-2-ol
1-cyclohexyl-1-ethanol
8-cyclohexyl-2-octanol
10-cyclohexyl-2-dodecanol
1-cyclopentyl-1-ethanol
8-cyclohexyl-2-octanol
6-cyclohexyl-2-dodecanol
3-phenyl-2-propanol
4-phenyl-2-butanol
9-phenyl-2-decanol
7-phenyl-2-dodecanol
11-phenyl-6-methyl-2-dodecanol
2,7-octanediol
2,10-undecanediol
2,11-dodecanediol
2,13-tetradecanediol
9-propyl-2,12-tridecanediol
2,16-heptadecanediol
2,19-eicosanediol
5-keto-hexenyl-2-ol
6-keto-2-octanol
8-keto-2-decanol
8-keto-6-methyl-2-decanol
9-keto-2-dodecanol
12-keto-2-tetradecanol
8-methyl-11-keto-2-tetradecanol
12-keto-2-heptadecanol
14-keto-2-eicosanol
17-octadecynyl-2-ol
10-keto-2-eicosanol
5-ethoxy-2-hexanol
5-pentoxy-2-hexanol
8-heptyloxy-2-octanol
10-(2-methyl hexyloxy)-2-decanol
12-decoxy-2-decanol
16-ethoxy-2-octadecanol
6-propanoyl-2-hexanol
7-pentanoyl-2-heptanol
9-ethanoyl-2-nonanol
10-hexanoyl-2-decanol
13-heptanoyl-2-tridecanol
16-butanoyl-2-hexadecanol
10-decanoyl-2-decanol The dehydration reaction may be structurally illustrated using the generic formula as follows:

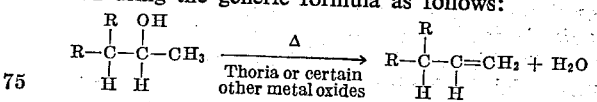

For convenience and simplicity hereinafter the catalyst discussion will be limited to thoria, although it is to be understood that the same teachings hold true, with suitable adjustments being made with regard to variations in degree of efficacy and/or necessary conditions associated therewith, for the other rare earth metal oxides specified hereinabove.

The 2-alcohol is contacted with thoria which has been heated to a temperature which is both sufficient to maintain the alcohol in the vapor state while in contact with the catalyst and sufficient to cause dehydration to the α-olefin. Although the temperature to which the catalyst is heated when contacted with the alcohol will be subject to some variation in correspondence to the particular catalyst, the particular alcohol used and, on occasion at least, the mode of preparation of the catalyst; the lowest temperature at which suitable conversion can be obtained is preferred. The foregoing holds true in addition to straight economic considerations because as the temperature of the catalyst increases, the selectivity of the catalyst (ability to yield terminal as opposed to internal olefins) appears to decrease some. This will be explained more fully hereinafter.

The thoria and other catalysts which is utilized in the present invention may be prepared in a number of ways well known to those skilled in the art. Among these are the thermal decomposition of the metal salts of organic acids or the metal carbonate. We have found that a particularly convenient and highly effective catalyst is obtained by thermal decomposition of thorium oxalate.

In decomposing thorium salts of organic acids or carbonate to thoria by heating, care must be taken not to heat it sufficiently high that sintering occurs. This begins to occur at about 550° C. to 600° C. and therefore the temperature range for the heat decomposition of thorium is about 300° C. to about 600° C.

Another important factor to be considered in connection with the heat treatment of the catalyst, as certainly will be readily appreciated, is the length of time at which the catalyst or catalyst stock is heated at the particular temperature in that instance. Thus the upper portion of the temperature range can be employed with equally satisfactory results as the lower portion providing the duration of heating at the higher temperatures is comparatively short. Fusion or sintering of the catalyst material can be avoided or minimized by limiting thermal treatment at higher temperatures to very short durations. Likewise appreciably higher decomposition temperatures can be employed if the duration of thermal treatment is kept sufficiently short. Conversely the heating time employed can be long at the lower temperatures. Generally, the catalyst is heated for a period of a few minutes, for example 5 minutes, to 24 hours. The longer times being employed at the lower temperatures and short times at the higher temperatures. The heat effect on catalyst should be kept in mind in conducting the dehydration reaction in addition to other factors pointed out hereinafter with regard to the dehydration.

In a preferred method of preparing thoria catalyst, thorium oxalate is heated to a temperature of about 350° C. to about 450° C. for a period of about 6 to about 24 hours. Usually such time will be sufficient for complete decomposition of the oxalate to the oxide. Should it not prove to be so on occasion additional heating even in excess of 24 hours will be desirable. This heating can be carried out while passing alcohol over same but, of course, the dehydration efficiency and selectivity will not be optimum until the catalyst has been completely converted to the oxide. In other words, thorium oxalate may be decomposed to the active catalyst in the same reactor and at the same conditions used in subsequent dehydration. The dehydration reaction can, in fact, be started before a catalyst of optimum activity has been attained and the activity will improve with time until the maximum value is reached.

After the thoria catalyst has been prepared in the preferred manner described, or by other suitable preparative process, the 2-alcohol which is to be dehydrated and is of the character hereinbefore described is heated to vaporize the alcohol and the vapors of the alcohol are passed in contact with the catalyst. The temperature to which the catalyst is heated is determined by a number of variables, the most important of which are the residence time and extent of conversion desired. These variables can be readily ascertained in each instance by those skilled in the art by routine tests once subjective decisions have been made relative to the independent variables.

On the matter of temperature, however, we point out that as the temperature of dehydration is decreased, the amount of the alcohol which is dehydrated or the degree of conversion of the alcohol to olefinic material decreases. On the other hand, as temperature increases there appears to be some decrease in catalyst life, but certainly selectivity decreases and at sufficiently high temperatures decomposition and other side reactions begin to increase and become significant. Considering these several described factors, it is generally preferable to operate at the lowest temperature at which a total olefin yield of the desired magnitude can be obtained. We have found that temperatures in the range of from about 330° C. to about 600° C. are suitable for the dehydration of the more common and available types of 2-alcohols and, within this range, a temperature of between about 350° C. and 450° C. is preferred. The latter temperature range being preferred with the preferred catalyst thoria and with the simultaneous use of the preferred alcohol 4-methyl-2-pentanol. It will be found convenient to preheat the alcohol as well as the catalyst before bringing them into contact. The alcohol in fact should be preheated to the vapor state.

The pressure which is utilized in the reaction chamber containing the thoria catalyst is subject to considerable variation and may range from substantially below atmospheric pressure to substantially in excess thereof. Again, the results which are obtained at a given pressure will be dependent upon the value which is utilized for several other parameters, such as temperature, state of catalyst activation and the type of alcohol used. In general, however, operation at subatmospheric pressures is preferred since this type of operation appears to give better results and prolong catalyst life. Usually the pressure employed is in the range of about 5 mm./Hg to 500 mm./Hg. It is possible to operate at a pressure of a fraction of millimeter of mercury but, of course, the lower the pressure the greater the expense. In the case of high boiling compounds such pressures even as low as 0.001 mm. Hg are possible and necessary to vaporize the alcohol at reaction temperature. Such extremely low pressures are not necessary for any reasons associated with the dehydration reaction itself. A preferred range of pressure is below 300 mm./Hg. For example, good results are obtained when the system is operated at about 100 mm./Hg when the alcohol is 4-methyl-2-pentanol.

When atmospheric pressure or above is utilized in the reaction chamber containing the catalyst, catalyst life in some cases appears to be reduced. The higher concentration of reactants and products would favor condensation reactions on the catalyst surface. The extent of these would be dependent on the particular alcohol used.

When operating at atmospheric or superatmospheric pressures, catalyst life can usually be prolonged by passing the 2-alcohol over the catalyst bed in admixture with vapors of a suitable volatile (at reaction conditions) inert hydrocarbon or other gaseous or vaporizable (at reaction conditions) inert diluent such as $N_2$. Examples of the hydrocarbons are ethane, butane, pentane, hexane, heptane, nonane, decane, dodecane and toluene. Conveniently the alcohol can be dissolved in the diluent (when it is liquid) prior to vaporising. The effect of the use of such solvents is to reduce the partial pressure of the alcohol over the catalyst bed so that there is greater opportunity for the molecules of the vaporized alcohol to contact the catalyst surface and less opportunity for side reactions to occur as a result of condensation of the alcohol molecules.

The residence time for this reaction, as with substantially all dehydration reactions, is relatively short. For example, the residence times are on the order of a fraction of a second to several minutes. The residence time is capable of considerable variation, however, by the variation of other parameters such as the pressure, temperature, catalyst and also the alcohol employed. An increase in the temperature calls for a decrease in residence time to obtain the same results prior to any such change in conditions. The residence time can, in some cases, run as high as about 15 minutes, however, generally the residence time will fall within the range of about 0.001 second to about 2 minutes. In most cases at least the conditions can be adjusted whereby the residence time can be regulated to fall in the range of about 0.1 to 10 seconds and such a range is preferred. We have found good results are obtained with 4-methyl-2-pentanol and a few other alcohols tested at residence times on the order of 0.1 to 1 second. The factors to keep in mind in connection with the residence times are that if the residence time is too short, conversion to olefinic material is too low, whereas if the residence time is too long in addition to such disadvantages as unnecessarily reducing the throughput and product of the reactor and the expense of needlessly supplying the energy involved, secondary reactions can occur and particularly when the residence times are unduly extended. The particularly suitable residence times and preferred residence times for the particular conditions and alcohol desired can be readily determined by routine experimentation facilitated by the teachings herein with regard to reaction variables.

It will be understood, of course, that all these reaction variables are more or less interdependent, and that when one is arbitrarily fixed, the limits within which others may be varied are somewhat restricted. The more desirable ranges for ordinary applications of this invention has been indicated, and can also be ascertained from the specific examples presented hereinafter. However, for any particular application of this invention, the most desirable conditions can be readily determined by trial by one skilled in the art, such a determination being facilitated by the discussion of trends of these variables presented herewith.

In the accompanying drawing, an apparatus which may be conveniently used for carrying out the reaction of the present invention has been illustrated. In the drawing, reference character 10 designates a suitable alcohol containing reservoir from which the 2-alcohol to be dehydrated may be fed through a control valve 12 and a metering pump 14 into the dehydration reactor designated generally by reference character 16. In passing into the dehydration reactor 16, the alcohol passes through a tube 18 which is packed or filled with glass beads 20 and is wrapped with a suitable preheating coil 22. Upon passing through the heated glass beads 20, the alcohol is vaporized prior to its entrance to the dehydration reactor 16.

The dehydration reactor 16 may suitably comprise an elongated reactor tube 24 which extends through an electric oven 26. The reactor tube 24 contains a bed 28 of the thoria catalyst, which catalyst is positioned medially of the length of the combustion tube and inside the electric oven 26 to facilitate heating of the catalyst to the desired temperature. A thermocouple 30 or other suitable temperature sensing device is positioned in the catalyst bed inside the reactor tube 24.

The combustion tube 24 is connected at its discharge end through a ground glass joint to the side arm 32 of a T-shaped collector vessel 34. The collector vessel 34 is connected at its upper end to a condenser 36 through which a suitable heat exchange medium, such as water, is circulated at a temperature such that the water and/or olefin produced in the reaction may be condensed and removed from the system through the valve 38 and discharge neck 40 at the lower end of the collection vessel 34. In order to prevent condensation of the reaction products in the reactor tube 24 and side arm 32, a post heater coil 42 is placed around these elements of the assembly. A suitable inlet 44 to the reactor for the inert gas, such as nitrogen, may be provided to facilitate blanketing the catalyst with an inert atmosphere to prevent charring of any condensed alcohol and also to facilitate flushing of the reactor upon completion of the reaction.

In the operation of the apparatus illustrated in the drawing, a 2-alcohol which it is desired to convert to an α-olefin is fed through the metering pump 14 from the alcohol reservoir 10 into the bed of heated glass beads 20. Upon contact with the glass beads 20, the alcohol is vaporized and passes into the reactor tube 24. As it passes through the reactor tube 24, the alcohol vapor contacts the catalyst bed 28 which has been heated by the electric oven 26. The temperature in the reactor tube 24 over the catalyst bed 28, as sensed by the thermocouple 30, is controlled by varying the heat in the electric oven.

Upon contact with the hot thoria catalyst, the 2-alcohol is dehydrated and is converted to a mixture of water and olefinic material. The olefinic material is comprised primarily of α- or terminal olefins. The vapors of the product material are passed out of the reactor tube 24 into the collection vessel 34 and are there condensed by heat exchange with water circulated through the condenser 36. Separation of the water and olefinic material may be effected by any suitable means in accordance with procedures well understood in the art.

The following examples of the use of a thoria catalyst to dehydrate 2-alcohols to the corresponding α-olefins demonstrate the general nature of the reaction of this invention and its utility as a method of synthesis. In performing the reactions described in the examples, the apparatus which is illustrated in the accompanying drawing was utilized. The thoria which was employed in the reactions of the examples was prepared by heating thorium oxalate at a temperature of from about 350° C. to 450° C. for a period of about 16 hours.

*Example 1*

270 ml. of methylcyclohexylcarbinol was passed over 5 grams of the thoria catalyst deposited on glass wool contained in the reactor tube shown in FIGURE 1. The alcohol was passed into the system at a rate of 0.5 ml. per minute as measured by the rate of flow of liquid alcohol from the alcohol reservoir 10. The catalyst temperature was maintained at about 365° C.

Analysis of the total effluent by gas chromatography indicated that 58.5 percent of the alcohol had been converted to olefinic material and that 92.2 percent of the olefin was the α-olefin, vinylcyclohexane. The selectivity of conversion to vinylcyclohexane was 97 percent during the initial portion of the run, but decreased to 85 percent by the end of the run. 201.4 grams of the reaction product was distilled through a packed column to yield 92.5 grams of olefin which was 97.2 percent vinylcyclohexane. The identification of the α-olefinic material was confirmed by infrared analysis.

*Example 2*

1044 grams of an 18.75 percent by weight toluene solution of 4-methyl-2-pentanol (196 grams of the alcohol) was passed over 2 grams of thoria suspended on glass beads (53 grams of glass beads having a size of from 80 to 100 mesh) at the rate of 0.5 ml. per minute. The catalyst temperature was 340±6° C. The olefin fraction was removed from the reaction product by distillation. 55.2 grams of the olefin was recovered and was found upon analysis to comprise 97 percent of 4-methyl-1-pentene. Analysis of the olefinic mixture was by gas chromotography confirmed by infrared analysis.

*Example 3*

210 ml. of 2-octanol was passed over 5 grams of thoria at a rate of 0.5 ml. per minute. The catalyst was heated to 334±5° C. Analysis indicated that 19 percent of the alcohol was converted to olefin and that the α-olefin, 1-octene, constituted 97 to 99 percent of the total olefinic product.

*Example 4*

3908 ml. of 4-methyl-2-pentanol was passed over 3 grams of thoria suspended on glass beads. The apparatus of FIGURE 1 was utilized except that two cold traps and a vacuum pump were added to the collector system to permit the system to be operated at subatmospheric pressure. The feed rate of the 2-alcohol was 0.5 ml. per minute, the catalyt temperature was 358±7° C. and the pressure was about 100 mm. of mercury. Analyses of the reaction product by gas chromatography confirmed by infrared showed that a conversion of 55 percent and a selectivity of 98 percent to 4-methyl-1-pentene was obtained.

*Example 5*

50 ml. of 4-methyl-2-pentanol was passed over 3 grams of didymia (43% La$_2$O$_3$, 31% Nd$_2$O$_3$, 9% Pr$_6$O$_{11}$ and 17% other rare earth oxides prepared from didymium carbonate) suspended on glass beads at a rate of 2.2 ml. per minute. The catalyst temperature was 413±8° C. and the pressure was about 95 mm. of mercury. Analyses of the product indicated that 31% of the 2-alcohol was converted and that 94% of the olefins was 4-methyl-1-pentene.

*Examples 6–11*

Additional runs were made using the same procedures and at the same conditions as set forth in Example 5 with the following catalysts being substituted for didymia Example 5; Y$_2$O$_3$, Er$_2$O$_3$, Dy$_2$O$_3$, Nd$_2$O$_3$; La$_2$O$_3$, Tb$_2$O$_3$ and the selectivity to the terminal olefin of the alcohol converted ranged from 90 to 97.1 percent.

As can be seen from the examples, we prefer the rare earth metal oxides wherein the rare earth metal is in the higher valent state.

Although certain methods of procedure and process parameters have been hereinbefore described by way of example, it will be appreciated by those skilled in the art that various modifications and innovations in such conditions and parameters may be made without departure from the basic concept underlying the present invention, namely, the utilization of certain metal oxide catalysts for selectively dehydrating 2-alcohols to α- or terminal olefins. Therefore, insofar as modifications and changes are made in the hereinbefore described conditions of operation and process parameters without departure from such basic principle, these changes are deemed to be compassed by the spirit and scope of the present invention except as the same may be necessarily limited by the language of the appended claims.

We claim:

1. A process of preparing α-olefins by selectively dehydrating 2-alcohols comprising contacting a 2-alcohol having the formula:

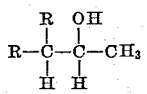

wherein R is selected from the group consisting of hydrogen, hydrocarbon radicals and substituted hydrocarbon radicals with the further provisions that at least one R is hydrocarbon in nature, that the hydrocarbon radical is selected from the group consisting of alkyl, alkenyl, alkynyl and cycloalkyl radicals, and the substituents on the substituted hydrocarbons are selected from the group consisting of keto, hydroxyl, alkoxy, ester groups and aryl radicals with the further provision that when the substituent is an aryl radical it is no closer to the alcohol 2-carbon than the 4 position, when the substituent is a keto group it is no closer than the 5 position, when the substituent is one of the group of a double bond, triple bond, hydroxyl, alkoxy and ester groups the substituent is no closer than the 6 position, in the vapor state with a metal oxide catalyst selected from the group consisting of thorium oxide, scandium oxide, yttrium oxide, and oxides of the rare earth metals at a temperature in the range of about 330° to about 600° C., and recovering an olefin product of which at least about 90% is alpha-olefin.

2. The process according to claim 1 wherein the pressure employed is subatmospheric.

3. The process according to claim 2 wherein the alcohol contains from 4 to 50 carbon atoms and has a boiling point below about 400° C. at a pressure above about 5 millimeters mercury.

4. A process according to claim 3 wherein one R is hydrogen and one R is an alkyl radical of 1 to about 17 carbon atoms.

5. The process according to claim 2 wherein the metal oxide catalyst is a rare earth metal oxide.

6. A process according to claim 2 wherein the metal oxide catalyst is didymia.

7. A process according to claim 2 wherein the metal oxide catalyst is yttrium oxide.

8. The process according to claim 1 wherein the alcohol is methylcyclohexylcarbinol.

9. The process according to claim 2 wherein a volatile inert diluent is employed in the reaction zone.

10. A process of selectively dehydrating 4-methyl-2-pentanol to 4-methyl-1-pentene which comprises passing said 4-methyl-2-pentanol in the vapor state over a metal oxide catalyst selected from the group consisting of thorium oxide, scandium oxide, yttrium oxide, and the rare earth metal oxides at a temperature in the range of about 330° to about 600° C. and a pressure in the range of about 0.001 mm. Hg to 1 atmosphere, and recovering an olefin product of which at least about 90% is 4-methyl-1-pentene.

11. A process of preparing α-olefins by selectively dehydrating 2-alcohols comprising contacting a 2-alcohol having the formula:

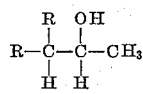

wherein R is selected from the group consisting of hydrogen, hydrocarbon radicals and substituted hydrocarbon radicals with the further provisions that at least one R is hydrocarbon in nature, that the hydrocarbon radical is selected from the group consisting of alkyl, alkenyl, alkynyl and cycloalkyl radicals, and the substituents on the substituted hydrocarbons are selected from the group consisting of keto, hydroxyl, alkoxy, ester groups and aryl radicals with the further provision that when the substituent is an aryl radical it is no closer to the alcohol 2-carbon than the 4 position, when the substituent is a keto group it is no closer than the 5 position, when the substituent is one of the group of a double bond, triple bond, hydroxyl, alkoxy and ester groups the substituent is no closer than the 6 position, in the vapor state with a thorium oxide catalyst at a temperature in the range of about 330° C. to about 600° C., and recovering an olefin product of which at least about 90% is α-olefin.

12. A process according to claim 11 wherein the catalyst is thorium oxide prepared by the thermal decomposition of thorium oxalate and at a temprature of about 300° C. to about 600° C.

References Cited by the Examiner

UNITED STATES PATENTS 1,895,529  1/1933  Taylor _____ 260—682

OTHER REFERENCES

Emmett, Catalysis, 1960, vol. VII, pp. 93–158.
Goldwasser et al., J. Am. Chem. Soc., 1939, vol. 61, pp. 1751–1761.
Pines et al. J. Am. Chem. Soc., 1961, vol. 83, No. 13, pp. 2847–2852.

ALPHONSO D. SULLIVAN, *Primary Examiner.*

D. S. ABRAMS, *Assistant Examiner.*